US010464488B2

(12) United States Patent
Kuester

(10) Patent No.: US 10,464,488 B2
(45) Date of Patent: Nov. 5, 2019

(54) MIRROR FLIPPER ASSEMBLY

(71) Applicant: Gentex Corporation, Zeeland, MI (US)

(72) Inventor: Ulrich A. Kuester, Spring Lake, MI (US)

(73) Assignee: GENTEX CORPORATION, Zeeland, MI (US)

( * ) Notice: Subject to any disclaimer, the term of this patent is extended or adjusted under 35 U.S.C. 154(b) by 223 days.

(21) Appl. No.: 15/709,883

(22) Filed: Sep. 20, 2017

(65) Prior Publication Data

US 2018/0079365 A1 Mar. 22, 2018

Related U.S. Application Data

(60) Provisional application No. 62/398,098, filed on Sep. 22, 2016.

(51) Int. Cl.
*B60R 1/04* (2006.01)
*B60R 1/08* (2006.01)
*B60R 1/12* (2006.01)
*B60R 1/00* (2006.01)

(52) U.S. Cl.
CPC ............... *B60R 1/086* (2013.01); *B60R 1/00* (2013.01); *B60R 1/04* (2013.01); *B60R 1/12* (2013.01); *B60R 2001/1253* (2013.01); *B60R 2300/20* (2013.01)

(58) Field of Classification Search
CPC .. B60R 1/04; B60R 1/086; B60R 1/12; B60R 2001/1253; B60R 2300/20
USPC .................................................. 359/604, 872
See application file for complete search history.

(56) References Cited

U.S. PATENT DOCUMENTS

| 3,421,728 A | 1/1969 | Gordon |
| 3,467,465 A | 9/1969 | Van Noord |
| 3,507,562 A | 4/1970 | Yamashita et al. |
| 3,522,987 A * | 8/1970 | Pflaum ................... B60R 1/086 359/606 |
| 3,870,404 A * | 3/1975 | Wilson ................... B60R 1/086 359/606 |
| 4,435,042 A * | 3/1984 | Wood ...................... B60R 1/086 359/603 |

(Continued)

FOREIGN PATENT DOCUMENTS

| EP | 0202757 A2 | 4/1985 |
| WO | 2016137891 A1 | 9/2016 |

*Primary Examiner* — Ricky D Shafer
(74) *Attorney, Agent, or Firm* — Price Heneveld LLP; Bradley D. Johnson

(57) ABSTRACT

A rearview mirror for a vehicle includes a housing defining an interior cavity and an actuation mechanism. The actuation mechanism includes a mounting plate rotatably coupled within the cavity of the housing at a first end thereof and a spring plate coupled with the mounting plate at a first coupling and slidably coupled with the mounting plate at a second coupling. The spring plate defines a resiliently deformable spring portion positioned between the first and second couplings and an arm portion extending away from the second coupling opposite the spring portion. The actuation mechanism further includes a toggle barrel positioned within the interior cavity of the housing and rotatable between first and second positions to compress the spring portion of the spring plate by movement of the arm portion by sliding of the spring plate with respect to the second coupling.

20 Claims, 6 Drawing Sheets

(56) References Cited

U.S. PATENT DOCUMENTS

| | | | |
|---|---|---|---|
| 4,826,289 A * | 5/1989 | Vandenbrink | B60R 1/086 |
| | | | 359/605 |
| 4,895,337 A | 1/1990 | Oskam et al. | |
| 5,956,181 A | 9/1999 | Lin | |
| 5,969,870 A | 10/1999 | Jain et al. | |
| 6,318,870 B1 | 11/2001 | Spooner et al. | |
| 6,321,159 B1 | 11/2001 | Nohtomi et al. | |
| 6,349,450 B1 | 2/2002 | Koops et al. | |
| 6,520,667 B1 | 2/2003 | Mousseau | |
| 6,549,691 B1 | 4/2003 | Street et al. | |
| 6,567,574 B1 | 5/2003 | Ma et al. | |
| 6,648,477 B2 | 11/2003 | Hutzel et al. | |
| 6,711,314 B1 | 3/2004 | Mori et al. | |
| 6,922,500 B2 | 7/2005 | Huang et al. | |
| 6,934,438 B2 | 8/2005 | Hoke | |
| 6,947,629 B2 | 9/2005 | Chu et al. | |
| 7,255,451 B2 | 8/2007 | McCabe et al. | |
| 7,329,013 B2 | 2/2008 | Blank et al. | |
| 7,510,287 B2 | 3/2009 | Hook | |
| 7,722,199 B2 | 5/2010 | DeWard et al. | |
| 7,888,629 B2 | 2/2011 | Heslin et al. | |
| 7,916,009 B2 | 3/2011 | Schofield et al. | |
| 8,351,454 B2 | 1/2013 | Jain et al. | |
| 8,817,359 B2 | 8/2014 | Chau | |
| 9,041,806 B2 | 5/2015 | Baur et al. | |
| 9,338,528 B2 | 5/2016 | Borkenhagen et al. | |
| 9,475,431 B2 | 10/2016 | Brummel et al. | |
| 9,529,157 B2 | 12/2016 | Zhang et al. | |
| 2002/0047378 A1 | 4/2002 | Bingle et al. | |
| 2002/0159171 A1 | 10/2002 | Schnell et al. | |
| 2003/0011906 A1 | 1/2003 | Marusawa et al. | |
| 2003/0011908 A1 | 1/2003 | Marusawa et al. | |
| 2003/0137757 A1 | 7/2003 | Wachi | |
| 2004/0148102 A1 | 7/2004 | McCarthy et al. | |
| 2004/0263988 A1 | 12/2004 | Lin | |
| 2005/0068647 A1 | 3/2005 | Brandt | |
| 2005/0213978 A1 | 9/2005 | Yamashita et al. | |
| 2005/0248847 A1 | 11/2005 | Weimer et al. | |
| 2006/0050018 A1 | 3/2006 | Hutzel | |
| 2007/0279756 A1 | 12/2007 | Rosario et al. | |
| 2008/0049344 A1 | 2/2008 | DeWard et al. | |
| 2008/0055757 A1 | 3/2008 | Uken et al. | |
| 2008/0077882 A1 | 3/2008 | Kramer et al. | |
| 2008/0225538 A1 | 9/2008 | Lynam et al. | |
| 2009/0040306 A1 | 2/2009 | Foote et al. | |
| 2010/0046104 A1 | 2/2010 | Rimac | |
| 2011/0176323 A1 | 7/2011 | Skiver et al. | |
| 2011/0188122 A1 | 8/2011 | Habibi et al. | |
| 2013/0107347 A1 | 5/2013 | Chau | |
| 2013/0279014 A1 | 10/2013 | Fish, Jr. et al. | |
| 2014/0347488 A1 | 11/2014 | Tazaki et al. | |
| 2017/0120824 A1 * | 5/2017 | Hallack | B60R 1/04 |
| 2017/0203694 A1 * | 7/2017 | Lundy | B60R 1/025 |
| 2019/0084480 A1 * | 3/2019 | Thelen | B60R 1/025 |

* cited by examiner

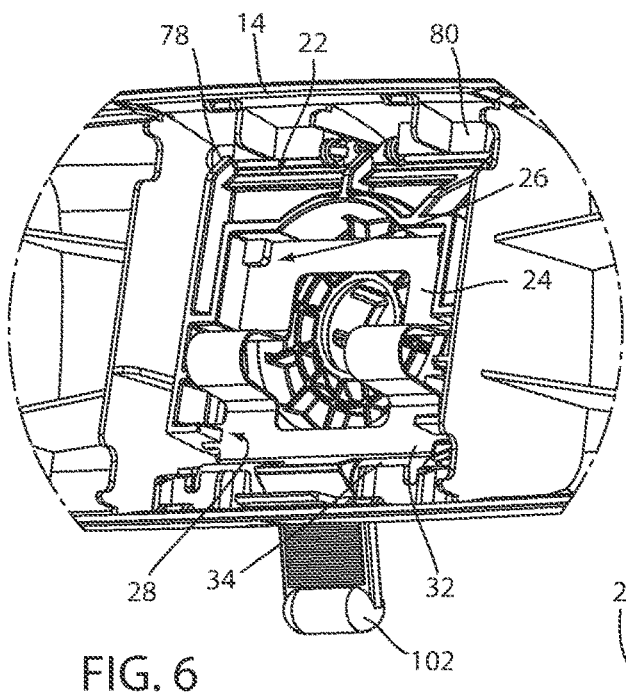
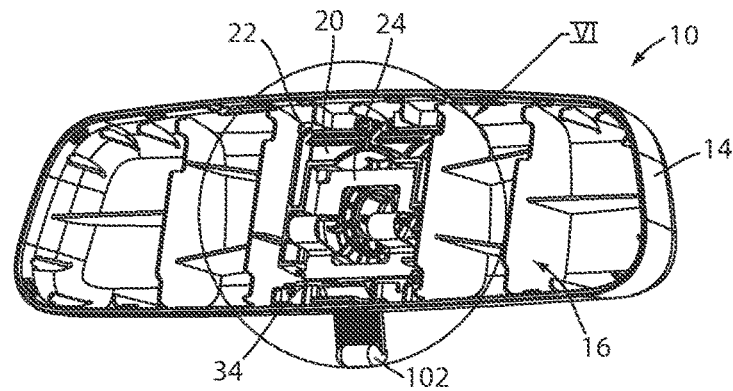
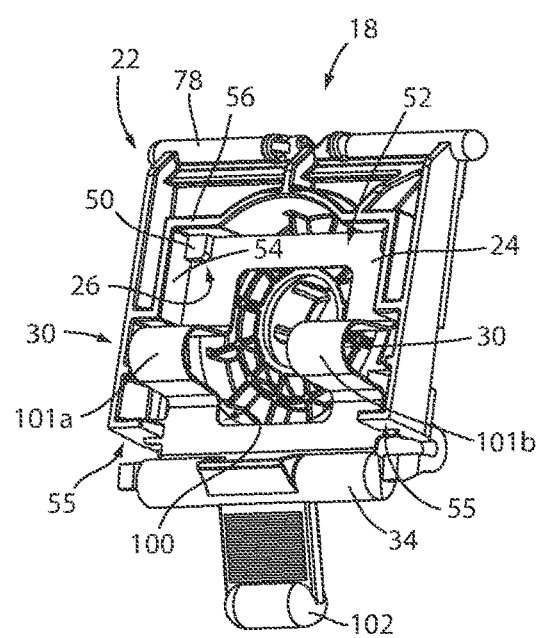
FIG. 5
FIG. 6
FIG. 7

MIRROR FLIPPER ASSEMBLY

CROSS REFERENCE TO RELATED APPLICATION

This application claims priority under 35 U.S.C. § 119(e) to U.S. Provisional Application No. 62/398,098, filed on Sep. 22, 2016, entitled "MIRROR FLIPPER ASSEMBLY," the disclosure of which is hereby incorporated herein by reference in its entirety.

TECHNOLOGICAL FIELD

The present disclosure relates generally to a rearview mirror actuator and more particularly, relates to an actuation mechanism including a spring portion between two couplings with an arm extending from a lowermost coupling to provide stable positions for the mirror and to reduce inadvertent movement from either stable position.

BACKGROUND

Various types of rearview mirrors can be used in connection with vehicle interiors. In general, rearview mirrors are mounted adjacent the windshield either by attachment with the windshield or to an internal component adjacent the headliner. Such attachment is, for example, achieved by a mounting that couples with an actuation mechanism internal to the mirror housing. A substrate is affixed with the mirror housing and is generally configured to present an image of the view to the rear of the vehicle and, accordingly, may be adjustable by movement of the housing about the mounting structure.

In the case of a standard rearview mirror, the substrate is often a prism-type mirror that provides for a viewing angle at which the substrate reflects the rearward view of the mirror with a reduced luminosity to provide a dimming effect useful when driving at night, for example. In such an embodiment, the dimmed viewing angle for the substrate may be at a predetermined angle upward (i.e. toward the headliner) relative to the "normal" viewing angle. To achieve such positioning, rearview mirrors include various types of actuation mechanisms to provide for user control in repositioning of the substrate. Such movement can be achieved by manipulation of a lever, which can cause the actuation mechanism to move between stable positions, thereby causing movement of the substrate through a predetermined angle relative to the mounting structure that appropriately positions the substrate in a corresponding viewing position. Further, the actuation mechanism can couple with the mounting to allow general adjustment of the housing and substrate with respect to the driver for viewing of the image viewable on the substrate. In this manner, the actuation mechanism can allow the substrate to toggle between the stable viewing positions without changing the positions themselves such that the substrate provides generally the same view in the night mode as has been selected for the standard mode.

Some existing actuation mechanisms achieve movement between the above-referenced stable positions by way of a resiliently deformable spring plate. In general, such spring plates include a bent section to provide an area of flexation that accommodates movement of components within the actuation mechanism. The spring force achieved by such flexation can urge the actuation mechanism to one of the stable positions. These types of structures, while providing biasing forces toward both stable positions, may provide force in the directions toward and away from the stable positions in varying amounts. In particular, the shape of the bent portion or portions may serve to secure the mechanism in one of the stable positions, including making it less susceptible to unintended movement out of such position by a force applied on the mirror housing, for example. However, in the opposite position, the mechanism may be susceptible, depending on the particular spring force and other internal forces, to inadvertent movement out of the stable position, which may be caused by a user adjusting the position of the mirror by grasping and moving the housing. In the case of a standard prism mirror, such inadvertent actuation may be inconvenient. Accordingly, further advances may be desired.

SUMMARY

According to an aspect of the present disclosure, a rearview mirror for a vehicle includes a housing defining an interior cavity and an actuation mechanism coupled within the interior of the housing. The actuation mechanism includes a mounting plate rotatably coupled within the cavity of the housing at a first end thereof and a spring plate coupled with the mounting plate at a first coupling and slidably coupled with the mounting plate at a second coupling. The spring plate defines a resiliently deformable spring portion positioned between the first and second couplings and an arm portion extending away from the second coupling opposite the spring portion. The actuation mechanism further includes a toggle barrel positioned within the interior cavity of the housing and rotatable between first and second positions to compress the spring portion of the spring plate between the toggle barrel and the first coupling by movement of the arm portion toward the second coupling by sliding of the spring plate with respect to the second coupling.

According to another aspect, a rear vision system for a vehicle includes a video camera mounted on the vehicle in a position to capture an image of a portion of an exterior thereof and a display mirror assembly having a substrate including a display in electronic communication with the camera for presenting the image thereon. A one-way reflective layer overlies the display. The display mirror further includes a mounting plate rotatably coupled within the cavity of the housing at a first end thereof and a spring plate coupled with the mounting plate at a first coupling and slidably coupled with the mounting plate at a second coupling. The spring plate defines a resiliently deformable spring portion positioned between the first and second couplings and an arm portion extending away from the second coupling opposite the spring portion. The display mirror further includes a housing supporting the display and defining an internal cavity and being rotatably coupled with a first end of the mounting plate within in the cavity and a toggle barrel positioned within the cavity of the housing and rotatable between first and second positions to compress the spring portion of the spring plate between the toggle barrel and the first coupling by movement of the arm portion toward the second coupling by sliding of the spring plate with respect to the second coupling.

According to another aspect, a vehicle includes a windshield, a headliner adjacent an upper edge of the windshield, and a mirror assembly. The mirror assembly includes a mounting plate rotatably coupled within the cavity of the housing at a first end thereof and a spring plate coupled with the mounting plate at a first coupling and slidably coupled with the mounting plate at a second coupling. The spring plate defines a resiliently deformable spring portion positioned between the first and second couplings and an arm portion extending away from the second coupling opposite the spring portion. A mounting structure is coupled with the mounting plate and is coupled with the vehicle adjacent the upper edge of the windshield. The mirror assembly further includes a housing supporting the display and defining an internal cavity and being rotatably coupled with a first end of the mounting plate within in the cavity, and a toggle barrel positioned within the cavity of the housing and rotatable between first and second positions to compress the spring portion of the spring plate between the toggle barrel and the first coupling by movement of the arm portion toward the second coupling by sliding of the spring plate with respect to the second coupling.

These and other features, advantages, and objects of the present device will be further understood and appreciated by those skilled in the art upon studying the following specification, claims, and appended drawings.

BRIEF DESCRIPTION OF THE DRAWINGS

FIG. 5 is a front-bottom perspective view of the rearview mirror of FIG. 3;

FIG. 6 is a detail view of the area depicted in FIG. 5;

FIG. 7 is a front perspective view of the actuation mechanism of the rearview mirror of FIG. 3;

FIG. 8 is a bottom-front perspective exploded view of the rearview mirror of

FIG. 3;

DETAILED DESCRIPTION OF EMBODIMENTS

Figure 1:
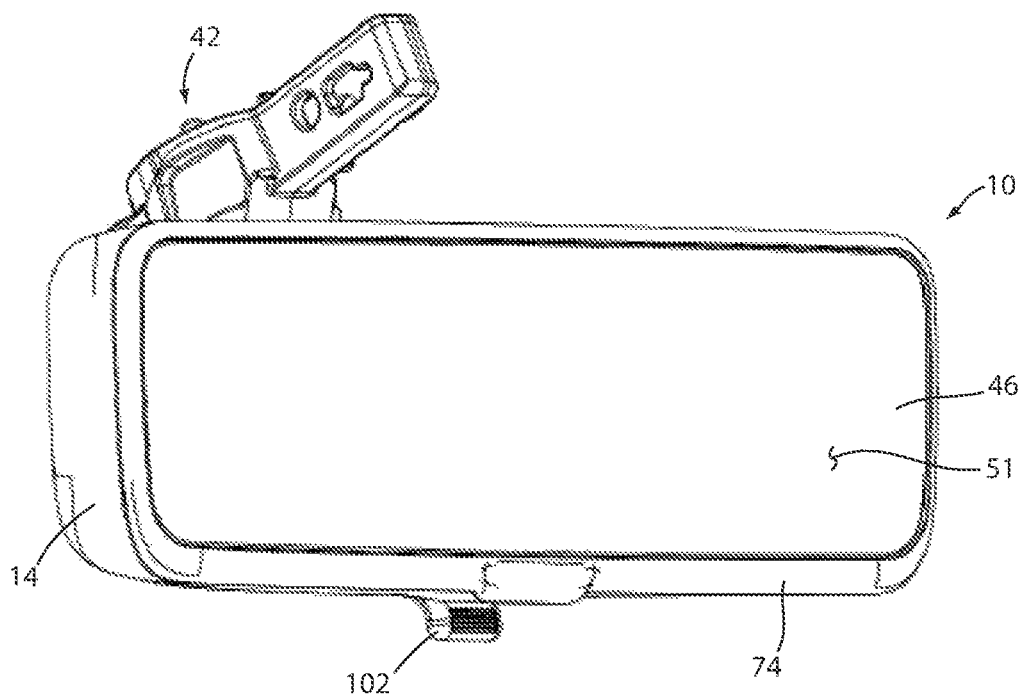
FIG. 1 is a front perspective view of a rearview mirror according to an aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally designates a rearview mirror 10 useable within a vehicle 12. Rearview mirror 10 includes a housing 14 defining an interior cavity 16 and an actuation mechanism 18 (FIG. 7) coupled within the interior cavity 16 of the housing 14. The actuation mechanism 18 includes a mounting plate 20 rotatably coupled within the interior cavity 16 of the housing 14 at a first end 22 thereof and a spring plate 24 coupled with the mounting plate 20 at a first coupling 26 and slideably coupled with the mounting plate 20 at a second coupling 28. The spring plate 24 defines a resiliently deformable spring portion 30 positioned between the first 26 and second 28 couplings and an arm portion 32 extending away from the second coupling 28 opposite the spring portion 30. The actuation mechanism 18 further includes a toggle barrel 34 positioned within the interior cavity 16 of the housing 14 and rotatable between first and second positions to compress the spring portion 30 of the spring plate 24 between the toggle barrel 34 and the first coupling 26 by movement of the arm portion 32 toward the second coupling 28 by sliding of a portion of the spring plate 24 with respect to the second coupling 28.

Figure 2:
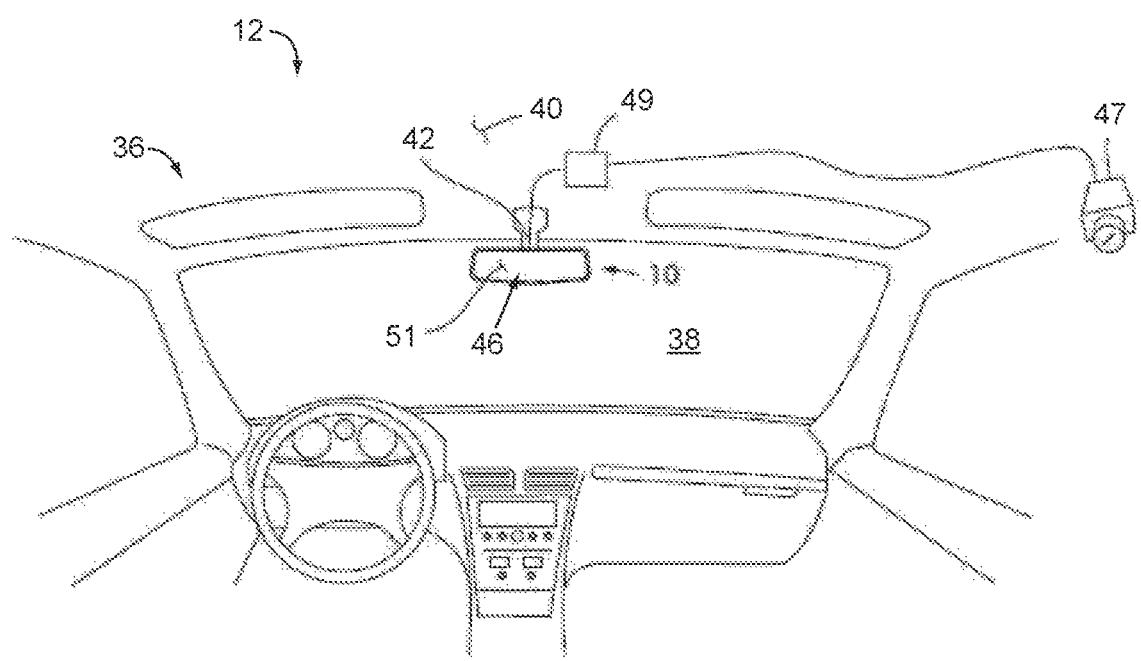
FIG. 2 is a perspective view of an interior of a vehicle including the rearview mirror of FIG. 1 therein.
Figure 3:
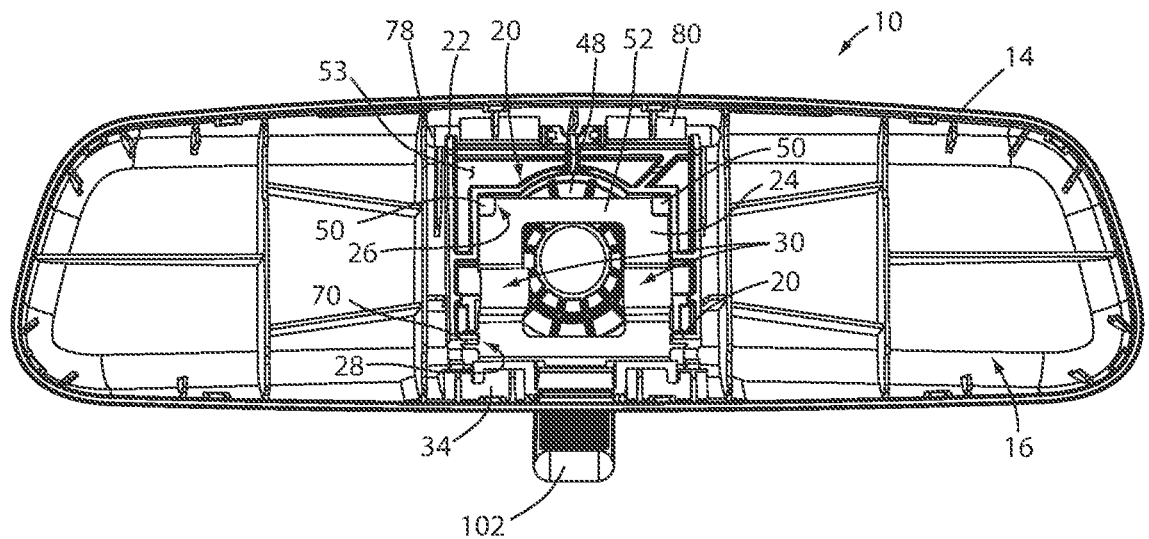
FIG. 3 is a front view of the rearview mirror of FIG. 1 with a substrate thereof removed to show an interior of, showing an actuation mechanism thereof.
Figure 4:
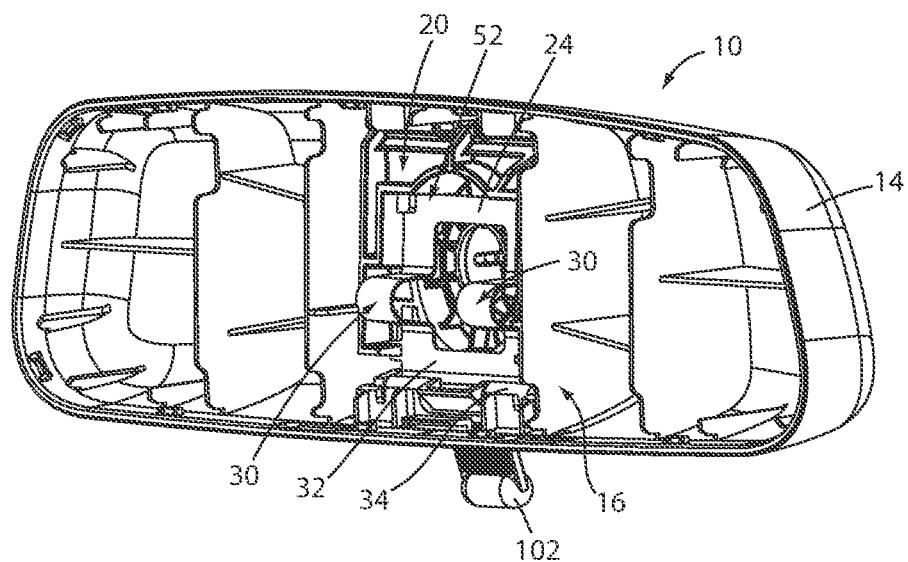
FIG. 4 is a front perspective view of the rearview mirror of FIG. 3.
Figure 8:
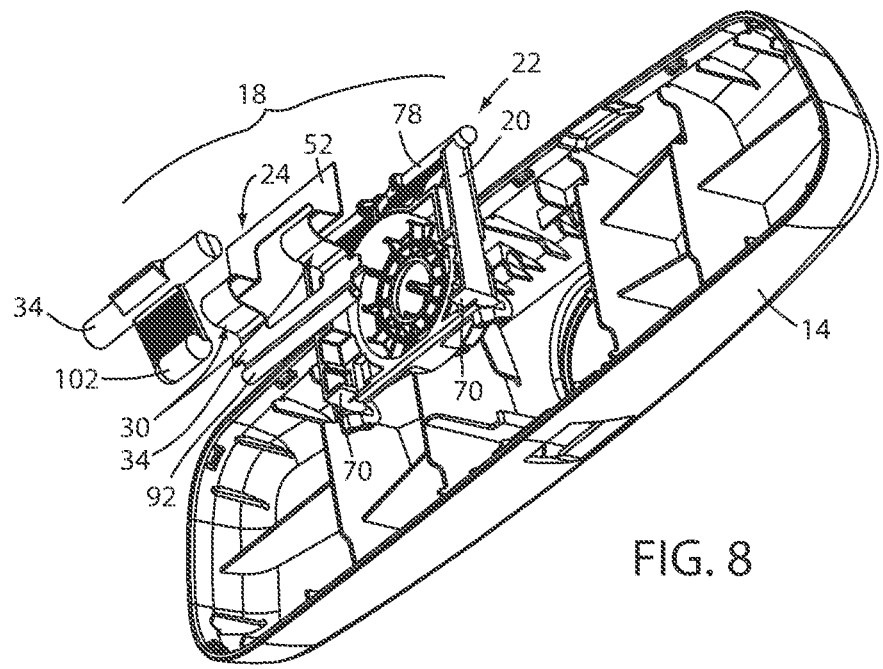
Figure 9:
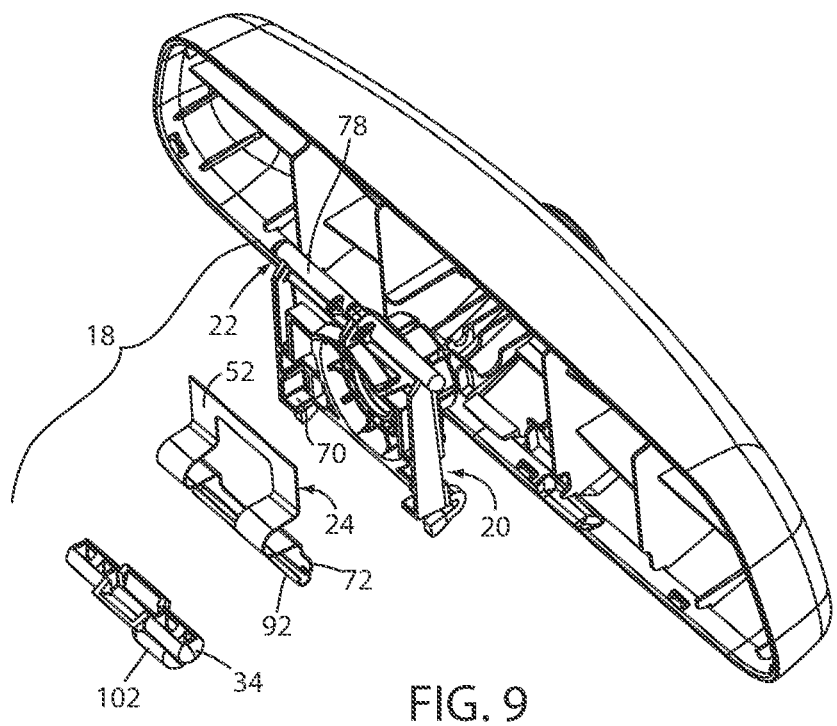
FIG. 9 is a top-front perspective exploded view of the rearview mirror of FIG. 3.
Figure 10:
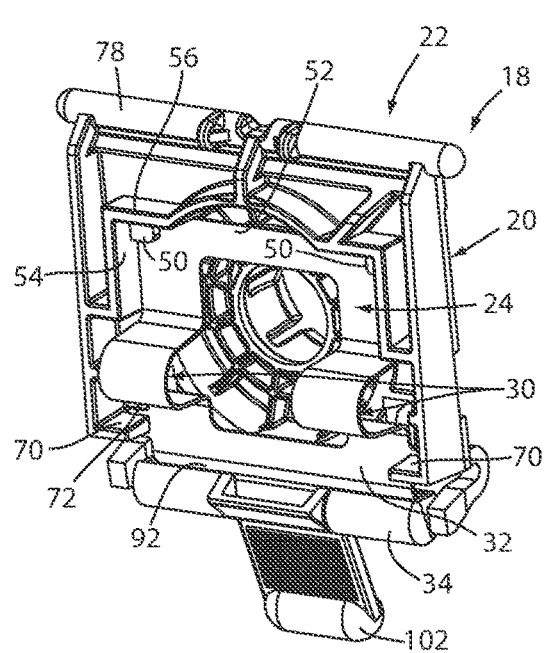
FIG. 10 is a top-front view of the actuation mechanism of FIG. 3.
Figure 11:
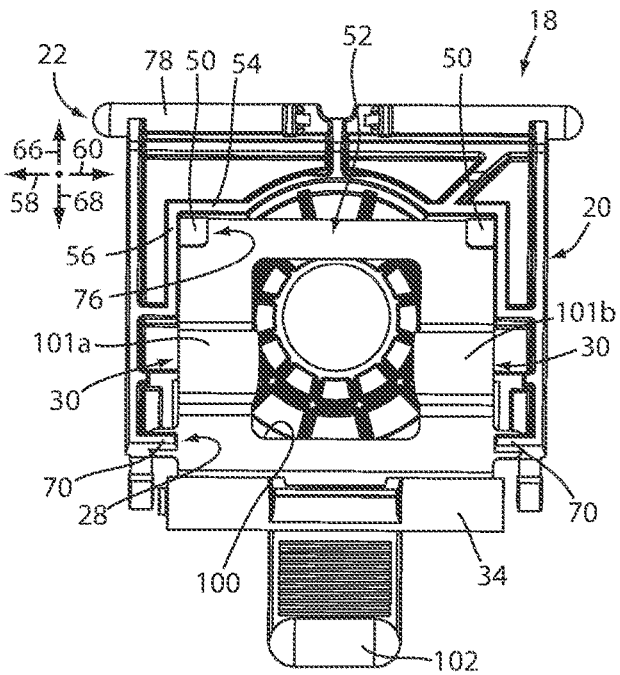
FIG. 11 is a front view of the actuation mechanism of FIG. 3.
Figure 12:
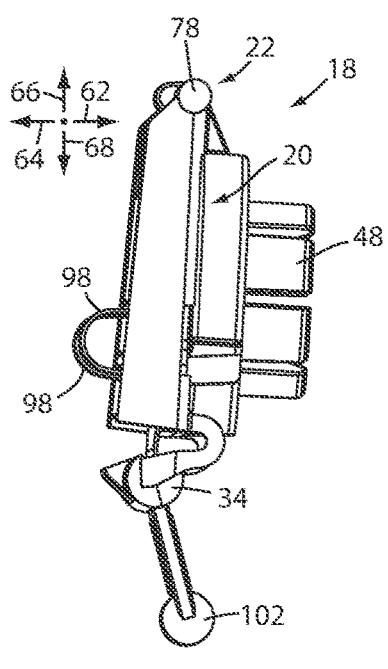
FIG. 12 is a right side elevation view of the actuation mechanism of FIG. 3.
Figure 13:
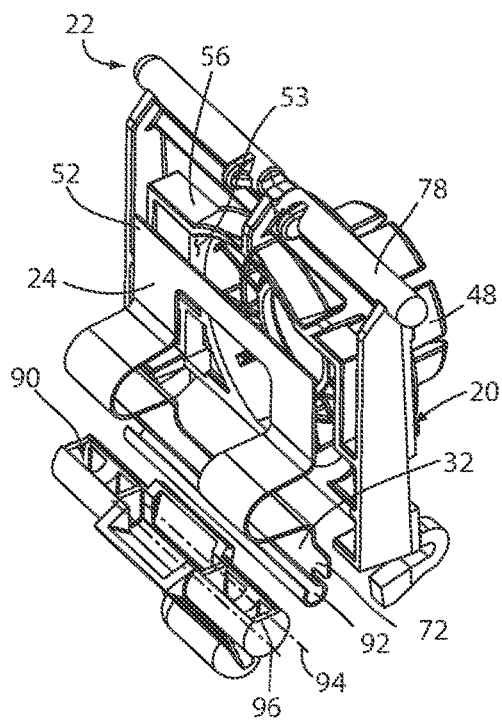
FIG. 13 is an exploded view of the actuation mechanism.

As shown in FIG. 2, rearview mirror 10 can be used in connection with a vehicle interior 36. In particular, rearview mirror 10 can be mounted adjacent a windshield 38 of vehicle 12 either by attachment with the windshield 38 itself or to an internal component adjacent headliner 40 (which may include a portion of the vehicle frame, a vehicle panel, or other support structure, for example). Such attachment is achieved by a mounting arm 42 that is coupled with vehicle 12, as described, and couples with actuation mechanism 18, as explained further below, by extending through an opening 44 (FIG. 14) in housing 14 (FIG. 1). Opposite opening 44, a substrate 46 is positioned over an open side 76 (FIG. 11) of housing 14. Substrate 46 is generally configured to present an image to a driver of vehicle 12 of the view to the rear of vehicle 12 and, accordingly may be adjustable by movement of housing 14 with respect to mounting arm 42. In one embodiment substrate 46 can be in the form of a prism mirror substrate of a generally transparent material having a tapered shape and an internal reflective surface. In this manner, the above-described rotation 82 of toggle barrel 34 can, as described further below, cause rotation of housing 14 and substrate 46 between a downwardly-angled position, in which the image reflected off of the highly-reflective surface is oriented toward the rear of the vehicle 12 so as to be visible by the driver, and an upwardly-directed position in which the highly-reflective surface reflects an image of the headliner 40, the outer, polished surface reflecting an image toward the rear of the vehicle 12. In general, this arrangement allows for separate day and night modes in which the upwardly-directed position presents a dimmer image to the driver, by way of the polished surface instead of the mirror surface.

In another embodiment, substrate 46 may include a video display along a portion or an entirety thereof such that rearview mirror 10 is what may be referred to as a full-display mirror. Substrate 46, when including such a display, may be referred to herein as "display substrate 46" and may be capable of displaying a mirror-image of the view to the rear of vehicle 12. Such an image may be captured by an appropriately-positioned video camera 47 (which may be positioned on the rear of vehicle 12, adjacent a rear windshield, or the like) and presented on display substrate 46 by circuitry 49 when the display substrate 46 is in an active state, the combined display substrate 46, camera 47, and circuitry 49 being considered a "rear-vision system" that can be included within vehicle 12. The image presented on display substrate 46 may generally replicate that which would be available from a typical reflective mirror and can be supplemented with other information presented on display substrate 46. In combination with such display substrate 46, a reflective surface 51 may be applied so as to overlie the display as a coating or separate element having properties to both provide a reflected image as well as to permit a video image of display substrate 46 to be visible therethrough.

The presence of reflective surface 51 permits substrate 46 to be used as a standard rearview mirror (i.e. without the need to view the displayed image) when the display is inactive, which may occur when the related vehicle 12 is not running or when power to the display substrate 46 is interrupted, for example. When in the active state, however, the presence of the reflective surface 51 over display substrate 46 can cause the image reflected by reflective surface 51 to compete with an image presented on display substrate 46. To alleviate such image competition, substrate 46 can be positioned such that reflective surface 51 reflects an image of the headliner 40 toward the driver. Because vehicle headliners are of generally consistent, non-reflective material, such an image may compete less with the video image of display substrate 46.

Figure 16:
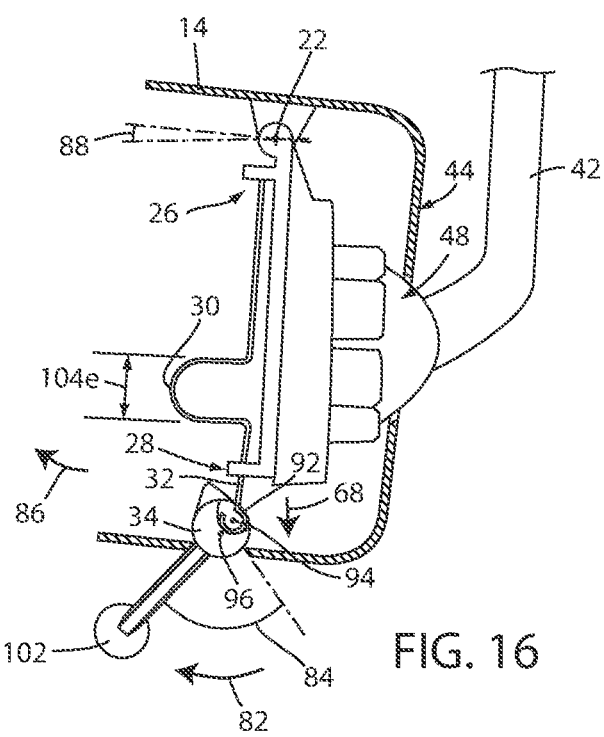
FIG. 16 is a side cross-section view of the rearview mirror of FIG. 3 in a second stable position.

Rearview mirror 10, by way of the actuation mechanism 18, including spring plate 24 and toggle barrel 34 can allow for a user to control repositioning of substrate 46 between the above-described downwardly and upwardly directed positions for the desired use of mirror 10, depending on the type of substrate 46. Such movement can be achieved by manipulation of lever 102 between the first position, shown in FIG. 14, to the second position, shown in FIG. 16, which can cause actuation mechanism 18 to change from a first stable configuration (as shown in FIGS. 3-14) to a second stable configuration (as shown in FIG. 16), which in turn causes movement of housing 14 and substrate 46 through a predetermined angle relative to mounting arm 42. In an example, such movement can be through an upward (i.e. toward headliner 40) angle 88 (FIG. 18) of between about 5° and 10°, and in one embodiment about 6°.

Figure 14:
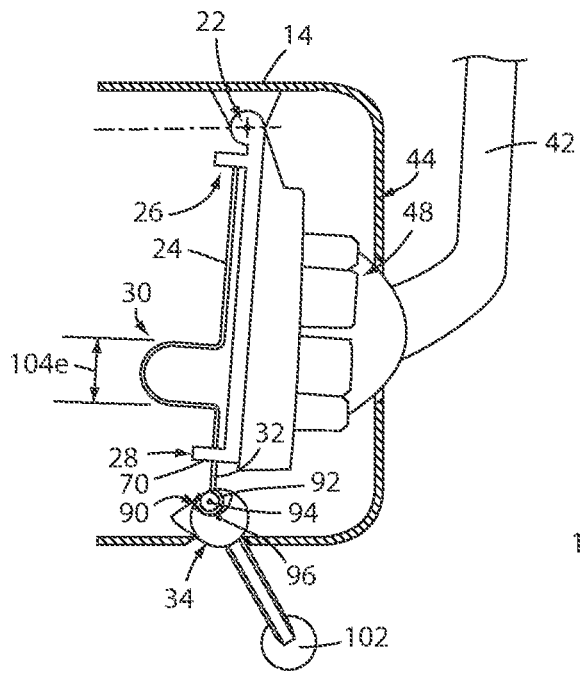
FIG. 14 is a side cross-section view of the rearview mirror of FIG. 3 in a first stable position.
Figure 15:
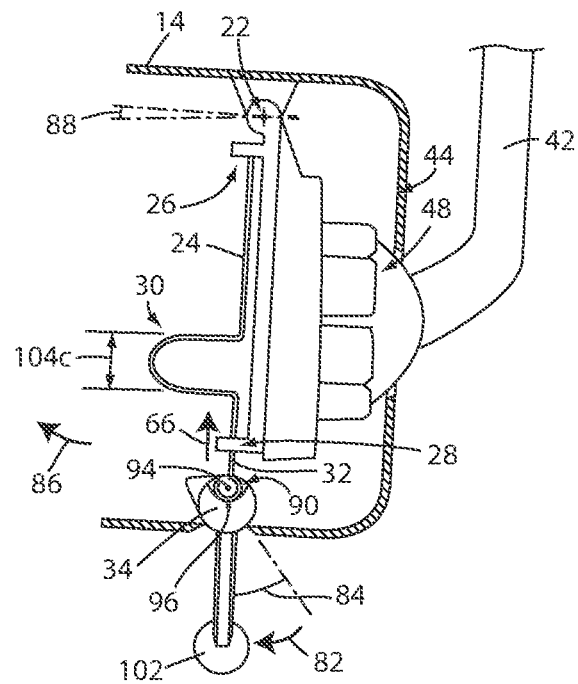
FIG. 15 is a side cross-section view of the rearview mirror of FIG. 3 in a transition position.

As shown in the cross-section views of FIGS. 14-16, mounting arm 42 can couple with actuation mechanism 18 by attachment with mounting plate 20 thereof by a ball and socket coupling 48. This arrangement can allow for the above-mentioned general adjustment of substrate 46 so as to position substrate 46 at a desired position with respect to the driver for viewing of the image viewable on substrate 46 in, for example a "day" mode. As described further below, movement of lever 102 from the first position to the second position, for example, can cause movement of housing 14 relative to mounting plate 20, while mounting plate 20 remains generally static. Such a configuration can allow substrate 46 to toggle between the positions for substrate 46 provided by the above-referenced stable conditions of actuation mechanism 18 without changing the positions themselves.

In either embodiment, the mechanism by which toggle barrel 34 repositions substrate 46 may be generally similar in operation to known rearview mirror toggle mechanisms, while reducing the likelihood of inadvertent actuation, which would be caused by a user adjusting the position of substrate 46 by grasping and moving housing 14, intending to move housing 14 relative to mounting arm 42 by movement of mounting plate 20 relative thereto. During such movement, particular forces can urge housing 14 toward an opposite one of the first and second stable positions with respect to mounting plate 20, which may cause such inadvertent actuation of actuation mechanism 18 and corresponding movement of housing 14 and, accordingly, substrate 46 into the other position. In the case of a standard prism mirror, such inadvertent actuation may be inconvenient. Further, in the case of a display mirror, as described above, movement out of the first position may trigger deactivation of display substrate 46, meaning that the desired view from rearview mirror 10 may change.

Accordingly, the present actuation mechanism 18 includes spring plate 24, as shown in FIGS. 3-13 with spring portion 30 at least partially defined by a reciprocal bend at a bent portion 98 positioned between first coupling 26 and second coupling 28. In particular, first coupling 26 is disposed toward or is adjacent to first end 22 of mounting plate 20 and is arranged so as to restrict movement of spring plate 24 relative to mounting plate 20 in at least five directions along three orthogonal axes. As illustrated, first coupling 26 can include a pair of constraint tabs 50 positioned at opposing sides of spring plate 24 along first end 52 thereof. Constraint tabs 50 can retain first end 52 of spring plate 24 against the opposing major surface 53 of mounting plate 20 and can, further, be closed along portions thereof adjacent the corresponding sides of spring plate 24, such as by extending from a side wall 54 and an upper wall 56 of mounting plate 20. In this manner, the two constraint tabs 50 together restrict the movement of first end 52 of spring plate 24 in opposite first 58 and second 60 lateral directions, opposite first 62 and second 64 longitudinal directions, and at least in upward vertical direction 66. In such an arrangement, first end 52 of spring plate 24 can be received in first coupling 26 in a press-fit or sliding engagement with constraint tabs 50 with the internal pressure of the remaining actuation mechanism 18 (discussed further below) maintaining first end 52 of spring plate 24 in engagement with first coupling 26 by pressure thereof against upper wall 56 (or other feature constraining in upward vertical direction 66). In a variation, first end 52 of spring plate 24 can be also fixed in downward vertical direction 68 by additional fixation with constraint tabs 50 (including by adhesives or the like) or by the use of an alternative structure for first coupling 26, such as screws or other mechanical fastener or one or more meltable tabs or the like configured to engage with corresponding holes adjacent first end 52 of spring plate 24.

By contrast, the second coupling 28 is configured to allow movement of spring plate 24 with respect thereto in upward vertical direction 66 and downward vertical direction 68 by a sliding engagement therewith. Similar to first coupling 26, however, second coupling 28 restricts movement of spring plate 24 in the lateral directions 58,60 and the longitudinal directions 62,64 with respect thereto. In the examples shown in FIGS. 8-13, second coupling 28 includes opposing slide tabs 70 that can be defined by portions of lower walls 55 of mounting plate 20. In particular, spring plate 24 can define a generally planar structure that fits within a cavity inward of upper wall 56 and the opposite, facing side walls 54 of mounting plate 20 and that matches a generally planar surface defined by portions of major surface 53 of mounting plate 20. Such a planar structure is interrupted by spring portion 30 of spring plate 24 and dividing spring plate 24 into upper and lower portions, the upper portion being generally fixed by first coupling 26.

Slide tabs 70 constrain spring plate 24 in the lateral directions 58,60 and capture spring plate 24 between slide tabs 70 and major surface 53 of mounting plate 20 in the illustrated example. In this manner, the portion of spring plate 24 opposite spring portion 30 from first end 52 can move in vertical directions 66 and 68 with respective compression and extension of spring portion 30. This sliding can allow corresponding movement of arm portion 32 of spring plate 24 in vertical directions 66 and 68 to accommodate rotation 82 of toggle barrel 34 and to provide for the above-mentioned stable positions of housing 14 about actuation mechanism 18. As illustrated, slide tabs 70 can capture a pair of corresponding spring plate tabs 72 that extend laterally from spring plate 24. In such an example, spring plate tabs 72 can have a height in the vertical directions 66,68 that is sufficient to accommodate the movement of the adjacent portions of spring plate 24, including arm portion 32, in the vertical directions 66,68 during movement of actuation mechanism 18 between the stable positions, as discussed further below.

The movement of housing 14 relative to mounting arm 42 is facilitated by the rotation 82 of toggle barrel 34 and corresponding movement of spring plate 24 causing the desired rotation of mounting plate 20 about first end 22 thereof. As discussed above, housing 14 defines an aperture (FIGS. 14-16) positioned adjacent mounting plate 20 such that mounting arm 42 can pass therethrough, thus allowing mounting plate 20 to pivotably couple with mounting arm 42 to retain rearview mirror 10 in an adjustable position with respect to windshield 38 or headliner 40. Accordingly, the above-described relative movement of housing 14 with respect to mounting plate 20 causes movement of housing 14 (and accordingly substrate 46 coupled therewith) in the form of rotation thereof about first end 22 of mounting plate 20. Such movement, in turn, moves substrate 46 between the above-described upward (FIG. 16) and downward (FIG. 14) positions. As illustrated, such orientation can be achieved by rotation of mounting plate 20 with respect to housing 14 through an angle of between about 5° and about 10°, and in one embodiment about 6°, although such an angle can vary based on the location and structure of rearview mirror 10.

As described above, movement of housing 14 and substrate 46 can be achieved by the above-described operative coupling of toggle barrel 34 with arm portion 32. In this arrangement, rotation 82 of toggle barrel 34, such as by manipulation of lever 102, causes rotation of housing 14, within which toggle barrel 34 is rotatably mounted. This rotation results in corresponding rotation of housing 14 about first end 22 of mounting plate 20 and upward or downward with respect to actuation mechanism 18 with which mounting plate 20 is adjustably fixed, as discussed further below.

Returning to FIGS. 3-5, housing 14 is shown in the form of a single-piece unit, and can further be made from a single piece of injection molded plastic or the like, although other materials are possible. Substrate 46 (FIG. 1) can be coupled to housing 14 by way of a bezel 74 or other secondary housing piece to fix substrate 46 over an open side 76 (FIG. 11) of housing 14. In another example, substrate 46 can be coupled directly to housing 14 over open side 76. In either example, housing 14 is structured so that interior cavity 16 is of a sufficient depth to retain internal structures thereof, including actuation mechanism 18, and other related structures.

As shown in FIGS. 5-7, mounting plate 20, as described above, is rotatably coupled with housing 14 at first end 22 thereof. Such coupling can be achieved by the incorporation of a first hinge portion 78 into first end 22 of mounting plate 20 and received within a second hinge portion 80 formed in housing 14. Alternatively, a separate hinge (not shown) can be coupled between mounting plate 20 and housing 14. As also shown in FIGS. 5 and 6, mounting plate 20 can generally extend through a majority of a vertical height of housing 14.

Returning to FIGS. 14-16, the operable coupling of arm portion 32 with toggle barrel 34 provides two stable positions for toggle barrel 34 that correspond to the first (FIG. 14) and second (FIG. 16) positions for housing 14, which are angularly spaced-apart from each other by angle 88 which may be between about 5° and about 10° (and in an embodiment about 6°). Further, such rotation of housing 14 about mounting plate 20 can be achieved through rotation 82 of toggle barrel 34 through an angle 84 of between about 70° and 100° and in one embodiment about 80°, for example. As discussed previously, the coupling of arm portion 32 with toggle barrel 34 can provide both for the desired rotation of housing 14 and for the above-noted stable positions. In particular, arm portion 32 is coupled with toggle barrel 34 by engagement of the end 92 thereof within socket 90, which is configured so as to receive arm portion 32 (such as by a cradling, snap, or press-fit arrangement) and to maintain a general position thereof such that the coupling axis 94 is offset from an axis 96 about which toggle barrel 34 rotates.

The offset arrangement of socket 90 with respect to axis 96 is such that socket 90 translates in the longitudinal horizontal directions 62,64 upon rotation 82 of toggle barrel 34 about axis 96. This translation causes movement of arm portion 32, which is coupled therewith, resulting in rotation of housing 14 about first end 22 of mounting plate 20. As discussed above, spring plate 24 is a unitary member of a resiliently deformable material, such as metal (e.g. spring steel, aluminum, or the like). The resilient deformability of spring plate 24 allows for the above-mentioned compression of spring portion 30 to accommodate the component movement of socket 90 in the upward vertical direction 66 during the rotation 82 of toggle barrel 34 by permitting corresponding upward vertical movement of arm portion 32. Notably, the constraint of first end 52 of spring plate 24 with respect to the upward vertical direction 66 prevents the portion of spring plate 24 above spring portion 30 from moving in such direction, thereby facilitating compression of spring portion 30 during rotation 82 of toggle barrel 34. In a similar manner, while the portion of spring plate 24 opposite spring portion 30 from first end 52 is permitted to slide in upward vertical direction 66 during such movement, the constraint of the spring plate 24 by slide tabs 70 in the lateral 58,60 and longitudinal directions 62,64 provides stability for spring plate 24, including of arm portion 32 during such movement. This stability prevents buckling of spring plate 24 during upward vertical movement of arm portion 32 (thereby transferring such movement into compression of spring portion 30) and facilitates transfer of the relative horizontal component of the socket 90 movement during toggle barrel 34 rotation to housing 14 by way of arm portion 32 remaining generally fixed with respect to mounting arm 42. Accordingly, rotation of housing 14 is achieved by such toggle barrel 34 rotation 82.

Spring plate 24 can be tuned to provide the above-noted stable positions for actuation mechanism 18 and, accordingly, rearview mirror 10. In particular, the resilient deformability of spring portion 30, particularly at the location of the bent portion 98 may be such that spring portion 30 exerts a spring force opposing the compression thereof that results from the vertical movement component of socket 90 during rotation 82 of toggle barrel 34 about axis 96. The particular spring force provided depends on the vertical component of the movement of socket 90, as well as the geometry and material of spring plate 24, particularly within spring portion 30. Accordingly, for a given material characteristic (including the associated stress/strain characteristics), both the thickness of spring plate 24 (i.e. in the longitudinal directions 62,64), as well as the width thereof (i.e. in the lateral directions 58,60) contribute to the spring force provided. As illustrated, spring plate 24 can include a window 100 therein that can be of a desired size to provide two separate arms 101a,101b within spring portion 30 of an appropriate width, given the thickness of spring plate 24, to provide the desired spring force for spring portion 30, while providing a desired stability for actuation mechanism 18 by the width of arm portion 32 in lateral directions 58,60.

The compressive force of spring portion 30 is sufficient to overcome the internal forces of actuation mechanism 18 (e.g. friction between and among the various components thereof) and to urge toggle barrel 34 into either of the positions thereof that are associated with the first position (as shown in FIG. 14) and the second position (as shown in FIG. 16), upon socket 90 passing a vertical-most position (i.e. the "inflection point") during rotation thereof, during which spring portion 30 is compressed to a height 104c that is less than the height 104e thereof when actuation mechanism 18 is in either stable position. In other words, spring portion 30 can provide a force on socket 90 in the generally vertically downward direction 68 that urges rotation 82 of toggle barrel 34 when socket 90 is on either side of the inflection point during rotation thereof. Further, spring plate 24 can be configured such that spring portion 30 is under compression when actuation mechanism 18 is in either stable position. As can be understood based on the disclosure herein, by structuring actuation mechanism 18 such that arm portion 32 of spring plate 24 moves upward in vertical direction 66 during rotation 82 of toggle barrel 34, the actuation mechanism 18 can eliminate the binding forces associated with other toggle mechanisms that utilize bent arm portions to both provide compression and articulation of toggle barrels with respect to their associated housings. Still further, generally even retention forces can be provided for both stable positions associated with actuation mechanism 18. Alternatively, varied retention forces can be predictably provided by the positioning of socket 90 about axis 96, given the compression of spring portion 30 achieved during rotation 82 of toggle barrel 34.

As illustrated in FIGS. 14-16, the movement of housing 14 between the first (FIG. 14) and second (FIG. 16) positions by actuation mechanism 18 is achieved by movement of lever 102 from corresponding first and second positions. As shown, lever 102 is coupled with (and can, further be integrally-formed with) toggle barrel 34 such that the movement of lever 102 from the first position (FIG. 14) to the second position (FIG. 16) through an angle 84 of rotation 82 thereof causes corresponding movement of toggle barrel 34 and, therefore, the above-described rotation of housing 14 about first end 22 of mounting plate 20 in direction 86 through angle 88. Alternatively, the actuation mechanism 18 described herein can be used to provide for stable positions and to prevent inadvertent movement out of such stable position in a full-display mirror having motorized movement and, accordingly, lacking a lever. Variations of such a mechanism are described in co-pending, commonly assigned U.S. patent application Ser. Nos. 15/053,252 and 15/053,290, the entire disclosures of which are hereby incorporated by reference herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
   a housing defining an interior cavity; and
   an actuation mechanism coupled within the interior of the housing and including:
      a mounting plate rotatably coupled within the cavity of the housing at a first end thereof;
      a spring plate coupled with the mounting plate at a first coupling and slidably coupled with the mounting plate at a second coupling, the spring plate defining a resiliently deformable spring portion positioned between the first and second couplings and an arm portion extending away from the second coupling opposite the spring portion; and
      a toggle barrel positioned within the interior cavity of the housing and rotatable between first and second positions to compress the spring portion of the spring plate between the toggle barrel and the first coupling by movement of the arm portion toward the second coupling by sliding of a portion of the spring plate with respect to the second coupling.

2. The rearview mirror of claim 1, wherein:
   the arm portion of the spring plate is operably coupled with the toggle barrel such that a force of the spring portion urges the arm portion away from the mounting plate and the toggle barrel into one of a first stable position and a second stable position respectively corresponding to a first rotational position and a second rotational position of the housing; and
   rotation of the toggle barrel between the first position and the second position compresses the spring portion by the movement of the arm portion toward the mounting plate.

3. The rearview mirror of claim 1, wherein the first coupling is disposed toward a first end of the spring plate relative to the second coupling and fixes the first end of the spring plate in at least five orthogonal directions with the mounting plate.

4. The rearview mirror of claim 3, wherein the at least five directions in which the first end of the spring plate is fixed with the mounting plate include opposite first and second lateral directions, opposite first and second longitudinal directions, and a first vertical direction away from the spring portion.

5. The rearview mirror of claim 1, wherein the second coupling is spaced from the first end of the mounting plate and fixes the spring plate in four orthogonal directions with the mounting plate, the spring plate being unfixed at the second coupling in two parallel directions orthogonal to the four orthogonal directions in which the spring plate is fixed by the second coupling.

6. The rearview mirror of claim 5, wherein the four directions in which the spring plate is fixed with the mounting plate at the second coupling consist of opposite first and second lateral directions and opposite first and second longitudinal directions, the spring plate being slideable at least in a first vertical direction toward the first end of the mounting plate at the second coupling.

7. The rearview mirror of claim 1, wherein a rotation of the toggle barrel between the first and second positions causes rotation of the housing about the mounting plate between first and second stable positions by movement of the first arm portion in corresponding first and second longitudinal directions.

8. The rearview mirror of claim 1, further including a mounting arm pivotably coupled with the mounting plate and extending through an opening in the housing.

9. The rearview mirror of claim 1, wherein the actuation mechanism further includes a lever extending from the toggle barrel through a corresponding opening in the housing.

10. The rearview mirror of claim 1, further including a display substrate coupled over an open side of the housing and having a reflective surface thereon.

11. The rearview mirror of claim 1, wherein:
the spring plate is a unitary element; and
the spring portion is defined therein by a reciprocal bend in the unitary element.

12. The rearview mirror of claim 1, wherein:
the spring plate includes an upper portion and an lower portion both extending along a plane; and
the spring portion extends away from the plane and separates the upper portion from the lower portion.

13. The rearview mirror of claim 1, wherein:
the mounting plate defines a cavity inward of an upper wall and opposite, facing side walls; and
the spring plate is received in the cavity of the mounting plate.

14. The rearview mirror of claim 13, wherein:
the first coupling is partially defined by portions of the upper wall and the opposite facing side walls; and
the second coupling is partially defined by portions of the side walls.

15. The rearview mirror of claim 14, wherein:
the first coupling includes first and second tabs extending between the upper wall and the first and second facing side walls, respectively; and
the second coupling includes third and fourth tab extending inwardly from the first and second side walls, respectively.

16. A rear vision system for a vehicle, comprising:
a video camera mounted on the vehicle in a position to capture an image of a portion of an exterior thereof; and
a display mirror assembly, comprising:
a substrate including a display in electronic communication with the camera for presenting the image thereon, a one-way reflective layer overlying the display;
a mounting plate defining a first end thereof;
a spring plate coupled with the mounting plate at a first coupling and slidably coupled with the mounting plate at a second coupling, the spring plate defining a resiliently deformable spring portion positioned between the first and second couplings and an arm portion extending away from the second coupling opposite the spring portion;
a housing supporting the display and defining an internal cavity receiving the mounting plate therein and being rotatably coupled with the first end of the mounting plate; and
a toggle barrel positioned within the cavity of the housing and rotatable between first and second positions to compress the spring portion of the spring plate between the toggle barrel and the first coupling by movement of the arm portion toward the second coupling by sliding of the spring plate with respect to the second coupling.

17. The rear vision system of claim 16, wherein:
the spring plate is a unitary element; and
the spring portion is defined therein by a reciprocal bend in the unitary element.

18. The rear vision system of claim 16, wherein:
the spring plate includes an upper portion and an lower portion both extending along a plane; and
the spring portion extends away from the plane and separates the upper portion from the lower portion.

19. The rear vision system of claim 16, wherein:
a rotation of the toggle barrel between the first and second positions causes rotation of the housing about the mounting plate between first and second stable positions by movement of the first arm portion in corresponding first and second longitudinal directions; and
when in the second position, the substrate is angled toward a headliner of the vehicle by between 5 degrees and 10 degrees relative to the first position.

20. A vehicle, comprising:
a windshield;
a headliner adjacent an upper edge of the windshield; and
a mirror assembly, comprising:
a reflective substrate;
a mounting plate rotatably coupled defining a first end thereof;
a spring plate coupled with the mounting plate at a first coupling and slidably coupled with the mounting plate at a second coupling, the spring plate defining a resiliently deformable spring portion positioned between the first and second couplings and an arm portion extending away from the second coupling opposite the spring portion;
a mounting structure coupled with the mounting plate and coupling with the vehicle adjacent the upper edge of the windshield;
a housing supporting the substrate and defining an internal cavity receiving the mounting plate and being rotatably coupled with the first end of the mounting plate; and
a toggle barrel positioned within the cavity of the housing and rotatable between first and second positions to compress the spring portion of the spring plate between the toggle barrel and the first coupling by movement of the arm portion toward the second coupling by sliding of the spring plate with respect to the second coupling.

* * * * *